US010567331B1

(12) United States Patent
Ledet

(10) Patent No.: US 10,567,331 B1
(45) Date of Patent: Feb. 18, 2020

(54) SEARCH AND NOTIFICATION PROCEDURES BASED ON USER HISTORY INFORMATION

(71) Applicant: Open Invention Network LLC, Durham, NC (US)

(72) Inventor: David Gerard Ledet, Allen, TX (US)

(73) Assignee: Open Invention Network LLC, Durham, NC (US)

(*) Notice: Subject to any disclaimer, the term of this patent is extended or adjusted under 35 U.S.C. 154(b) by 743 days.

(21) Appl. No.: 14/583,169

(22) Filed: Dec. 25, 2014

(51) Int. Cl.
*G06Q 10/06* (2012.01)
*H04L 12/58* (2006.01)
*G06F 17/27* (2006.01)
*G06Q 10/10* (2012.01)
*G06F 17/21* (2006.01)
*G06F 3/0484* (2013.01)
*G06F 9/54* (2006.01)

(52) U.S. Cl.
CPC .......... *H04L 51/36* (2013.01); *G06F 3/04842* (2013.01); *G06F 9/542* (2013.01); *G06F 17/212* (2013.01); *G06F 17/27* (2013.01); *G06F 17/2705* (2013.01); *G06F 17/278* (2013.01); *G06Q 10/06* (2013.01); *G06Q 10/10* (2013.01); *G06Q 10/101* (2013.01); *G06Q 10/103* (2013.01); *H04L 51/00* (2013.01); *H04L 51/16* (2013.01); *H04L 51/18* (2013.01); *H04L 51/32* (2013.01)

(58) Field of Classification Search
CPC ........ G06F 17/27; G06F 17/278; G06F 9/542; G06Q 10/10; G06Q 10/101; G06Q 10/103; G06Q 10/06; H04L 51/00; H04L 51/16; H04L 51/18
See application file for complete search history.

(56) References Cited

U.S. PATENT DOCUMENTS

| 7,016,937 | B1* | 3/2006 | Malik ................. G06Q 10/107 709/206 |
| 7,069,271 | B1 | 6/2006 | Fadel et al. |
| 7,130,885 | B2* | 10/2006 | Chandra ............. G06Q 10/107 709/206 |
| 7,734,696 | B2* | 6/2010 | Osterberg, Jr. ......... H04L 51/00 709/206 |
| 8,306,809 | B2* | 11/2012 | Hammer ............ G06F 17/2785 704/9 |
| 8,527,347 | B2 | 9/2013 | Pulijala et al. |
| 8,554,626 | B2 | 10/2013 | Pulijala et al. |

(Continued)

*Primary Examiner* — Amy Ng
*Assistant Examiner* — Sajeda Muhebbullah

(57) ABSTRACT

Identifying notification sent to user devices may provide an optimal approach to identifying data sources and updating a user device with information pertinent to known or identified user interests. One example method of operation may provide parsing notification message content of a notification message, linking a data source to the notification message content to create a hybrid user interface data feed, transmitting the initial hybrid user interface data feed to a number of message recipients, monitoring at least one of the data sources to identify a change to data content of the initial hybrid user interface data feed, and intercepting a change parameter during the monitoring of the data sources, and updating the hybrid user interface data feed based on the intercepted change parameter.

14 Claims, 13 Drawing Sheets

(56) References Cited

U.S. PATENT DOCUMENTS

| | | | | |
|---|---|---|---|---|
| 8,577,422 B1* | 11/2013 | Ledet | ............... | G06F 3/011 |
| | | | | 345/173 |
| 9,104,995 B1* | 8/2015 | Wang | ............... | G06Q 10/06 |
| 9,405,602 B1* | 8/2016 | Verne | ............... | G06F 9/545 |
| 2005/0198146 A1* | 9/2005 | Chowdhury | ...... | G06Q 10/06 |
| | | | | 709/206 |
| 2007/0283278 A1* | 12/2007 | Hupfer | ............. | G06F 9/542 |
| | | | | 715/751 |
| 2008/0040427 A1* | 2/2008 | Shroff | ............. | G06Q 10/10 |
| | | | | 709/204 |
| 2014/0195476 A1* | 7/2014 | Sxhmidt | ........ | G06F 17/30345 |
| | | | | 707/609 |
| 2015/0271097 A1* | 9/2015 | Kay | ............... | G06Q 10/06 |
| | | | | 709/226 |

* cited by examiner

US 10,567,331 B1

SEARCH AND NOTIFICATION PROCEDURES BASED ON USER HISTORY INFORMATION

TECHNICAL FIELD OF THE APPLICATION

This application relates to information identification and more specifically to identifying information relevant to a user application and creating notifications to promote such information.

BACKGROUND OF THE APPLICATION

Business applications, such as enterprise resource planning (ERP) and customer relationship management (CRM) applications, manage interactions between business entities and customers and/or between customers and users. ERP may include a software platform that assists with managing business processes, and which permits the corresponding organization to use integrated applications to manage the business and provide automation functionality to back office functions. ERP software integrates organization functions, such as marketing, sales, manufacturing processes, product development and product planning.

CRM is a software management tool that permits management of an organization's interactions with current and future customers by incorporating technology to organize, automate and synchronize sales, marketing, customer service, and technical support. Many CRM applications integrate social networking sites and provide focus on event management and relationship tracking. Such applications provide a foundation for product management, however, the level of precision offered by such applications is limited.

SUMMARY OF THE APPLICATION

One example embodiment may provide a method that includes parsing notification message content of a notification message, linking a data source to the notification message content to create a hybrid user interface data feed, transmitting the initial hybrid user interface data feed to the plurality of message recipients, monitoring at least one of the plurality of data sources to identify a change to data content of the initial hybrid user interface data feed, intercepting a change parameter during the monitoring of the at least one of the plurality of data sources, and updating the hybrid user interface data feed based on the intercepted change parameter.

Another example embodiment may include an apparatus that includes a memory and a processor configured to parse notification message content of a notification message, link a data source to the notification message content to create a hybrid user interface data feed. The apparatus also includes a transmitter configured to transmit the initial hybrid user interface data feed to the plurality of message recipients. The processor is further configured to monitor at least one of the plurality of data sources to identify a change to data content of the initial hybrid user interface data feed, intercept a change parameter during the monitoring of the at least one of the plurality of data sources, and update the hybrid user interface data feed based on the intercepted change parameter.

Yet another example embodiment may include a method that provides identifying a present application being utilized on a computing device, identifying at least one attribute of the present application, comparing the at least one attribute of the present application to attributes of other applications not currently being utilized by the computing device, matching the at least one attribute of the present application to at least one attribute of a comparable application responsive to the comparing of the at least one attribute to attributes of other applications, and generating a notification in a user interface of the present application to identify the comparable application.

Another example embodiment may include an apparatus that includes a memory, and a processor configured to identify a present application being utilized on a computing device, identify at least one attribute of the present application, compare the at least one attribute of the present application to attributes of other applications not currently being utilized by the computing device, match the at least one attribute of the present application to at least one attribute of a comparable application responsive to the comparison of the at least one attribute to attributes of other applications, and generate a notification in a user interface of the present application to identify the comparable application.

DETAILED DESCRIPTION OF THE APPLICATION

Figure 1:
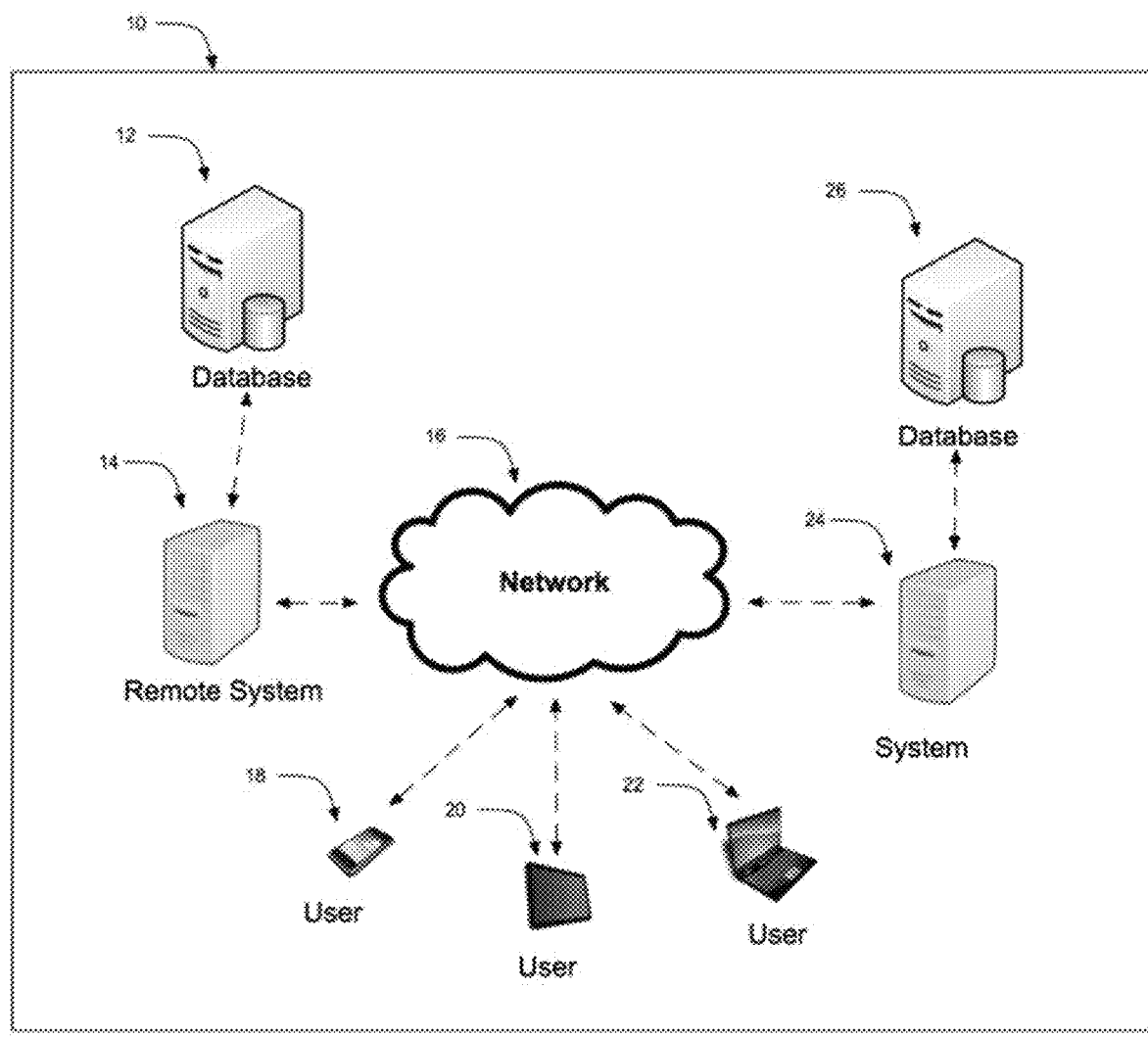
FIG. 1 illustrates a system diagram according to an example embodiment of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments of the present application provide a proactive analysis to expose potential problems that may or may not exist prior to the development of actual problems in the business and product cycle. The system application may interwork with the user via a computing device to ascertain the issues being experienced and offer solutions based on ongoing monitoring of a product. In addition, the assistance provided may be tracked such that future assistance is based on previously successful assistance that was identified and logged. Also, the metrics of the product's acceptance in the market among other metrics may be determined by one or more operations, such as historical data of the product in the market. This approach takes into account the historical acceptance of the product in the market. Another approach may include the organizations' own metrics determined by an analysis of how the product is expected to perform in the market.

FIG. 1 illustrates a network diagram 10 of the present application. The present application, in the form of software for example, permits a user utilizing a mobile client machine 18, a tablet computer 20, a laptop or desktop computer 22 in the form of software, for example, to be downloaded from the system server 24. The client's device may also be a gaming system, a DVD player, or any other device that contains a processor and memory. The present application may alternatively reside on the client's device 18/20/22 that can be any of a mobile laptop device and/or a personal desktop computer or a mobile device. The computing device 18/20/22 is connected to the network 16, which may be the Internet or any other type of network through wired or wireless communication. It should be noted that other types of devices, in addition to devices 18/20/22, might be used with the present application. For example, a PDA, an MP3 player or any other wireless device, a gaming device, such as a hand held system or home based system and the like including a personal computer (PC) or other wired device that can also transmit and receive information could be used with the present application.

The user of the application can interface with the client device 18/20/22 and connect through the network 16 to the system server 24. The system server 24 can be redundant or may be more than a single entity without deviating from the scope of the application. A database 26 is directly connected to the system server 24 and/or may be connected remotely through the network without deviating from the scope of the application. A remote system 14 communicates with the network 16, and the remote system 14 can be redundant or may be more than a single entity without deviating from the scope of the application. A database 12 is directly connected to the remote system 14 or may be connected remotely through the network 16 without deviating from the scope of the application.

The user database can reside in the system server 24, or the database 26 may be either directly connected to the system server 24 or remotely through the network 16. The application resides completely or partially on the user's device 18/20/22, which can be a mobile device, but can also reside on a user's desktop computer, a personal digital assistant (PDA), tablet computer, or any other device containing a processor, memory, and an operating system. In addition, the application can reside either completely or partially on any one of the other computing elements in the system depicted in FIG. 1, for example, the system server 24, the database 26, the remote system 14, the database 12, and/or the network 16.

If the application of the current application resides on a device, the application of the current application is downloaded through a platform (such as an application store or market) residing on the device or accessed via the device, or may be accessed through the device's browser communicably coupled to the Network 16. Further, the application of the current application can be pre-loaded on the device. The current application of the current application can work with any device such as a personal computer with a touch screen, a laptop with a touch screen, a personal computing tablet, a smartphone, a PDA or any device with a processor, memory and a touch screen.

The application in its operating state can reside in the client device 18/20/22, the system server 24, the remote system server 14, the database(s) 12/26, or any other computer (i.e., a device containing a processor and memory) in the architecture. The user may use an input device, otherwise referred to as a pointing device, to interact with the display. This input can be a gesture input, voice input, a pointing device or any other input used to interact with a device. The gesture input can utilize such gestures as touch gestures. Touch screens may also be used where a keyboard and mouse do not permit a suitably intuitive, rapid, or accurate interaction by the user with the display's content, such as a kiosk.

A version of gestures referred to as "Multi-Touch Gestures" utilizes multiple simultaneous touches to provide additional functionality. For example, a user can perform "pinching" where two fingers are brought together to zoom out on an image. Another multi-touch gesture called "reverse pinching" refers to the spreading of two fingers apart, and is used to enlarge a picture or zoom in on an image. Some devices include a recent operating system which supports many multi-touch gestures where 2, 3 and even 4 fingers can be used to perform various actions on components on the display.

Other input to the computing device(s), such as gesture and voice-to-text input can be included. The combining of both voice input and gestures is made possible by the combining of the touch gesture and voice-to-text functionalities interworked with the mobile device software development kit (SDK). Speech recognition is built into many common mobile device SDKs. For example, in the ANDROID release of SDK 1.5, a library included in that release called 'android.speech' permits speech recognition functionality.

In the ANDROID 1.5, speech recognition is done through the 'RecognizerIntent' function. The intent starts an activity that will prompt the user for speech and send it through the speech recognizer. For example, the code below starts an activity with an intent and the application waits for the result:

Intent intent=new Intent("android.speech.action.RECOGNIZE_SPEECH");

startActivityForResult(intent, 0).

The startActivityForResult method launches an Activity returning the result. While speech recognition is performed, it displays an overlay over the application, and when completed returns the results back to an activity. The action: 'RECOGNIZE_SPEECH' starts an activity to recognize the speech and send the result back to the activity. The voice recognition application that handles the intent also processes the voice input, then passes the recognized string back to the application by calling the 'onActivityResult( )' callback.

ANRDOID supports two language models for speech analysis: free form for dictation, and web search for shorter, search-like phrases. The current application utilizes the 'free form' model. Finally, the example below depicts code to integrate speech-to-text to the application:

```
// Check to see if a recognition activity is present
PackageManager pkgmgr = getPackageManager ( );
List activities = pkgmgr.queryIntentActivities (
    new Intent (RecognizerIntent.ACTION_RECOGNIZE_SPEECH),
    0);
if (activities.size ( ) != 0)
{ speakButton.setOnClickListener (this);
} else
  { speakButton.setEnabled (false);
    speakButton.setText ("Recognizer is not present");
  }
}
```

The sample pseudocode above first verifies that the target mobile device is able to interwork with the speech input, then uses 'startActivityForResult( )' to broadcast an intent requesting voice recognition, including the extra parameter specifying one of two language models. The voice recognition application that handles the intent processes the voice input, then passes the recognized string back to your application by calling the 'onActivityResult( )' callback.

Further detailing both the speech-to-text and gesture functionalities on a mobile device, the gesture functionality is now functionally described. The touch gesture functionality is inherent on smartphones in the market today. This functionality permits the user to use their finger (or other touch mechanism) to interface with the mobile device. In a common smartphone operating system in the market today, the primary point of access for touch data is the 'android.view.MotionEvent' class. This class is passed to the views of the current application via the 'onTouchEvent' and 'onInterceptTouchEvent' methods. 'MotionEvent' contains data about "pointers," or active touch points on the device's screen. Through a 'MotionEvent' you can obtain X/Y coordinates as well as size and pressure for each pointer. 'MotionEvent.getAction( )' returns a value describing what kind of motion event occurred.

In the application environment, the 'onTouch' event is fired when the touch screen is interacted with by the user's finger or touching device (i.e. stylus, etc.). The application can handle the 'onTouch' event can be handled similar to the following code shows:

```
public boolean onTouchEvent (MotionEvent event) {
    int action = event.getAction( );
    switch (action) {
        case (MotionEvent.ACTION_DOWN) :
            // Touch screen pressed
            break;
        case (MotionEvent.ACTION_UP) :
            // Touch screen touch ended
            break;
        case (MotionEvent.ACTION_MOVE) :
            // Contact has moved across screen
            break;
        case (MotionEvent.ACTION_CANCEL) :
            // Touch event cancelled
            break;
    }
    return super.onTouchEvent(event);
```

The pseudocode above handles different actions of the returned 'onTouch' event thrown when the user interacts with the touch screen. The application can perform actions based upon the exact touch event thrown by the system. Interacting touch gestures with speech recognition is possible by an application executing on a mobile device. As described above, classes exist that permit applications to call methods for both functionalities. The pointing device can be any normally used pointing device for interacting with a device, for example, a finger, multiple fingers, a stylus, or otherwise another device regularly used to interface with a touch display on a device.

Example embodiments below permit for a user to provide input such that this input is received by the application. In each of the scenarios where input is discussed, this data can be input in various forms (e.g., text, audio, video, photo, multimedia, etc.). The data can be received in various ways, for example, manually, verbal, touch, hover, eye, dynamic, automatic, etc.

Figure 2:
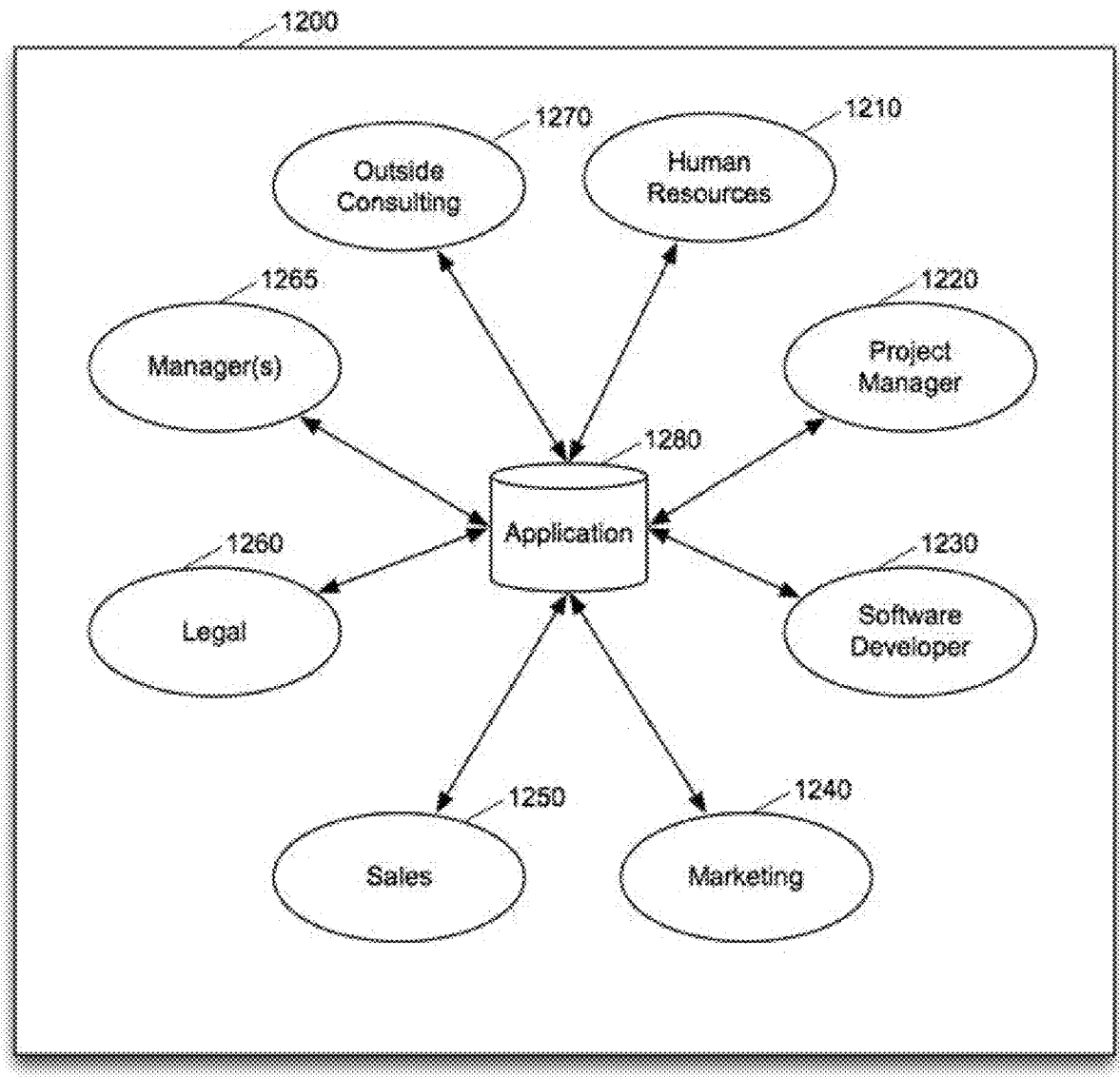
FIG. 2 illustrates a flow diagram of a product sales procedure according to an example embodiment of the present application.

FIG. 2 illustrates a possible implementation depicting the data interactions with the application and various business entities in an organization 1200. The application 1280 is illustrated as a database, but it should be understood that this figure is pertaining to the data of the application only. It should also be understood that the database might reside locally inside the device 18/20/22 and/or externally in the system servers 14/24 and/or a local database 12/26 without deviating from the scope of the current application.

The business entities depicted in FIG. 2 are a subset of all business entities and serve to provide a sample of the entities with which the application can interact. Other entities of a large organization can easily be interworked with the application, such as executives, secretaries, paralegals, librarians, researchers, finance, etc. without deviating from the scope of the current application. The application alters the display of data according to the entity with which it is presenting the data. The data presented is configured such that a subset of the total available data is delivered to the particular entity in a manner that it is easily understood, and so only the pertinent data is presented.

In one example, the human resources (HR) entity 1210 interacts with the application, as it is most commonly associated with personnel matters. For example, hiring additional employees in the organization and attrition matters. Also, the HR entity 1210 can interact with the application for scenarios involving personnel matters of the employees. The project manager entity 1220 would interact with the application for scenarios involving the organization's projects. For example project schedules, such as deadlines and extensions, software developers assigned to projects and other personnel in the organization tied to a project, project requirements, customer interactions related to a project, etc.

The software developer entity 1230 interacts with the application for scenarios involving the developers. For example, questions regarding projects (both internal and external), personnel matters regarding developers, etc. The marketing entity 1240 interacts with the application for scenarios involving the marketing of projects and/or the marketing of the organization in general. For example, internal and external marketing requests, issues, alterations, etc. of the marketing aspects. The sales entity 1250 interacts with the application for scenarios involving sales in the organization. This may include the customer interactions regarding projects in the organization, new sales opportunities in the organization as well as existing customers, the future projects pertaining to new customers, etc. The legal entity 1260 interacts with the application for scenarios involving legal aspects of the organization (both internal and external). For example, tax issues, import and export laws, intellectual property issues, personnel issues, etc. The manager(s) entity 1265 interacts with the application for scenarios involving most of the interactions within the organization as most employees have at least one manager. This entity can include one level of management, a subset of all levels of management, or all levels of management.

The outside consulting entity 1270 interacts with the application for scenarios involving existing and new projects at least where the outside consulting entity is involved. For example, existing personnel belonging to the outside entity working on a project in the organization as well as new personnel sought for projects in the organization. The application interacts with various entities within the organization, providing details related to each entity's particular function. As such, interacting with other business applications using a published application programming interface (API) is possible by utilizing those application's data in the current application.

Figure 3:
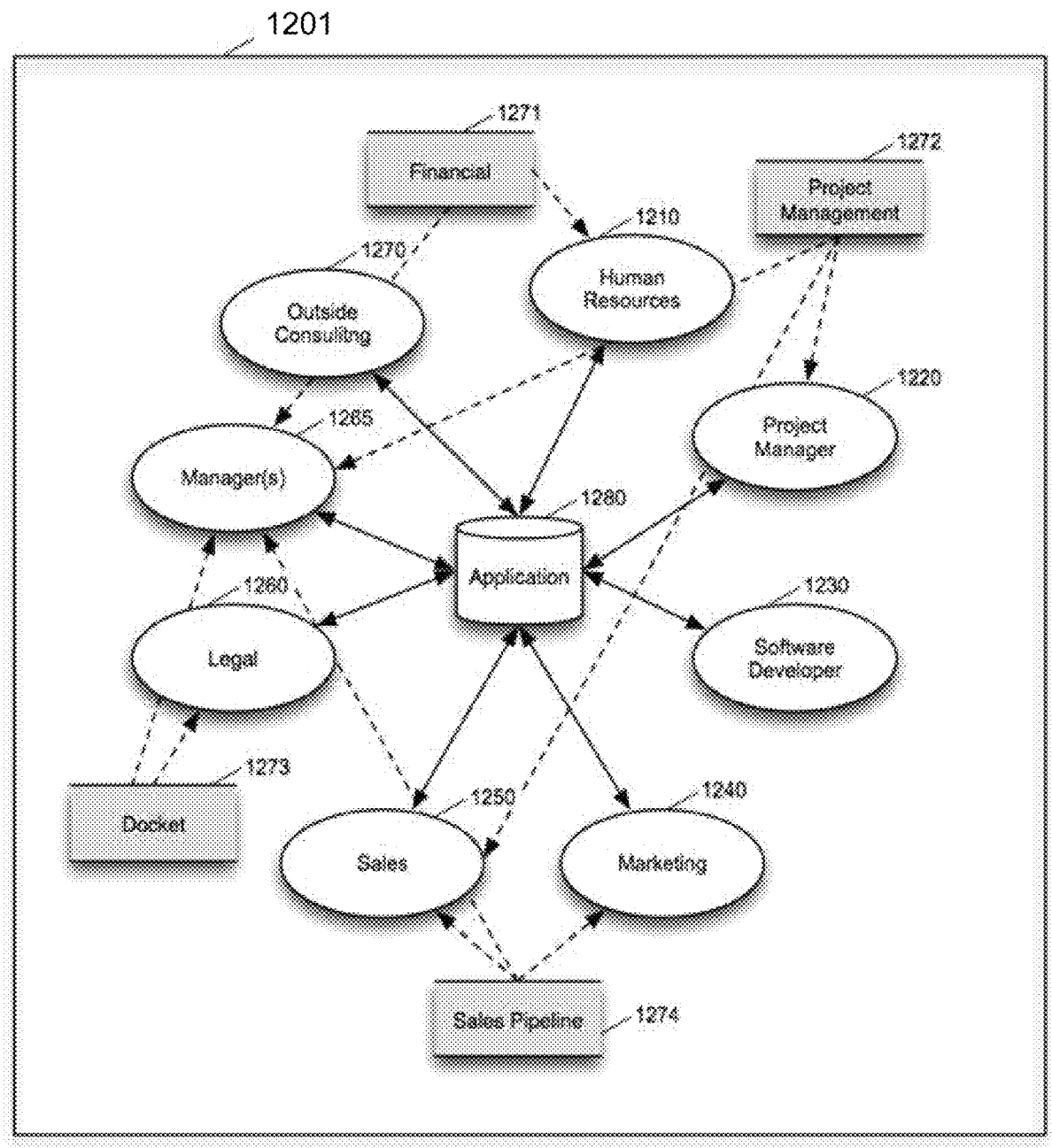
FIG. 3 illustrates a product flow diagram of user satisfaction feedback according to an example embodiment of the present application.

FIG. 3 illustrates an application's interaction with business entities in greater detail according to example embodiments. For instance FIG. 3 is a possible implementation further depicting the data interactions with the application and business entities 1201. The external applications 1271, 1272, 1273 and 1274 depict how these applications are interworked into the current application and the various entities. For instance, the financial application 1271 offers budget data that may be of use to the human resources entity 1210 and the manager(s) entity 1265 such that the application can present data in notifications that permit the human resource entities to easily view current budget data and which may help the human resource entity 1210 to determine additions and subtractions of personnel within the organization.

The project management application 1272 offers details related to the current projects within the organization. This data is interconnected with the sales entity 1250, the project manager(s) entity 1220 and the manager(s) entity 1265. When notifications are presented to the human resources 1210 and project manager entity 1220, current project related data can be presented offering data such as current project timelines, dates of deliverables, etc. This current data may assist the entities by permitting them to easily ascertain the impact of changes to deliverables, the moving of deliverable dates, adding or subtracting personnel from projects, etc.

The sales pipeline application 1274 offers details related to the sales pipeline, or current customers and future customers. This data is interconnected with the sales entity 1250, the marketing entity 1240 and the manager(s) entity 1265. When notifications are presented to the sales entity 1250 and marketing entity 1240, current sales related data can be presented offering data, such as current customers' deliverables and future sales deliverables. This current data may assist the entities by permitting them to see the impact of current sales, changes and the addition or subtraction of other customers related to the current pipeline.

The docket application 1273 offers details related to legal actions related to the organization. This data is interconnected with the legal entity 1260 and the manager(s) entity 1265. When notifications are presented to the various entities, the 'legal' related data could be presented offering data, such as the timelines of current legal-related areas. This current data may assist the entity by permitting them to view the impact of such legal actions related to the organization.

Example embodiments provide for an application which permits for the dynamic presentation of data that has been present and/or revised, and displaying this updated data to recipient(s) who may be interested in the revision to such data in an autonomous manner. The presentation of the data is performed through a notification sent to recipients by the application. The application can be the client device 18/20/22, or any wearable or non-wearable device containing a processor and memory. The application interworks with remote programs to determine changes that may affect the business organization. For example, project management software where the data pertains to projects within the organization.

The projects in the project management software application may contain timelines and deadlines for each person on the project. Published APIs allow $3^{rd}$ party products access to the internal data within the project management software. Obtaining access to the API of remote products permits for the capture of specific events pertaining to changes that may be of interest to entities within the organization. These remote products may exist in the same client device 18/20/22, or exist remotely in the network 16. Alternatively, they may exist in the system(s) serves 14/24 communicably connected to the network 16. For example, assume that a developer has notified the project manager that a delivery date will be missed. The notification originated by the developer is sent to the project manager and the data movement is noted and an update is made to the project management software where the project date is shifted due to the change by the developer.

Having the date shifted may cause issues with the organization due to commitments previously made to the related customer or due to allocation of persons and resources. The application automatically notifies related entities that a change has been made to the project by sending a notification to entities that normally interact with the project management software application. This may include entities, such as managers, sales, project managers, and possibly others. The application automatically delivers a notification through the application, informing them that the project has been modified. The application, interworking with the API of remote business applications, for example project management software, docketing software, financial software, etc., determines when a dynamic notification is necessary to be sent. For example, in interworking with project management software, the current application registers for events through the project management API that are triggered when a project's schedule is altered. In addition, the current application can determine if the schedule has been lengthened or shortened through API calls. If it is determined that the schedule of a project has been modified, the current application then knows that a notification can be generated to those recipients whom are interested in receiving this information. By registering for event notification of the remote business applications, the current application is able to keep updated of changes in those applications, and notify interested entities of the change. Furthermore, the current application permits for communication through the internal messaging of the application where details of the alterations can be identified in a single system application.

The automatic and/or dynamic notifications of the application are described where changes in remote business applications, for example project management software, docketing software, financial software, etc., are noticed by the application and acted on accordingly. The application may register for particular events that are offered by the remote application via published APIs. These APIs are used to interact with the remote applications where the application can act on the alterations of the remote applications.

Figure 4:
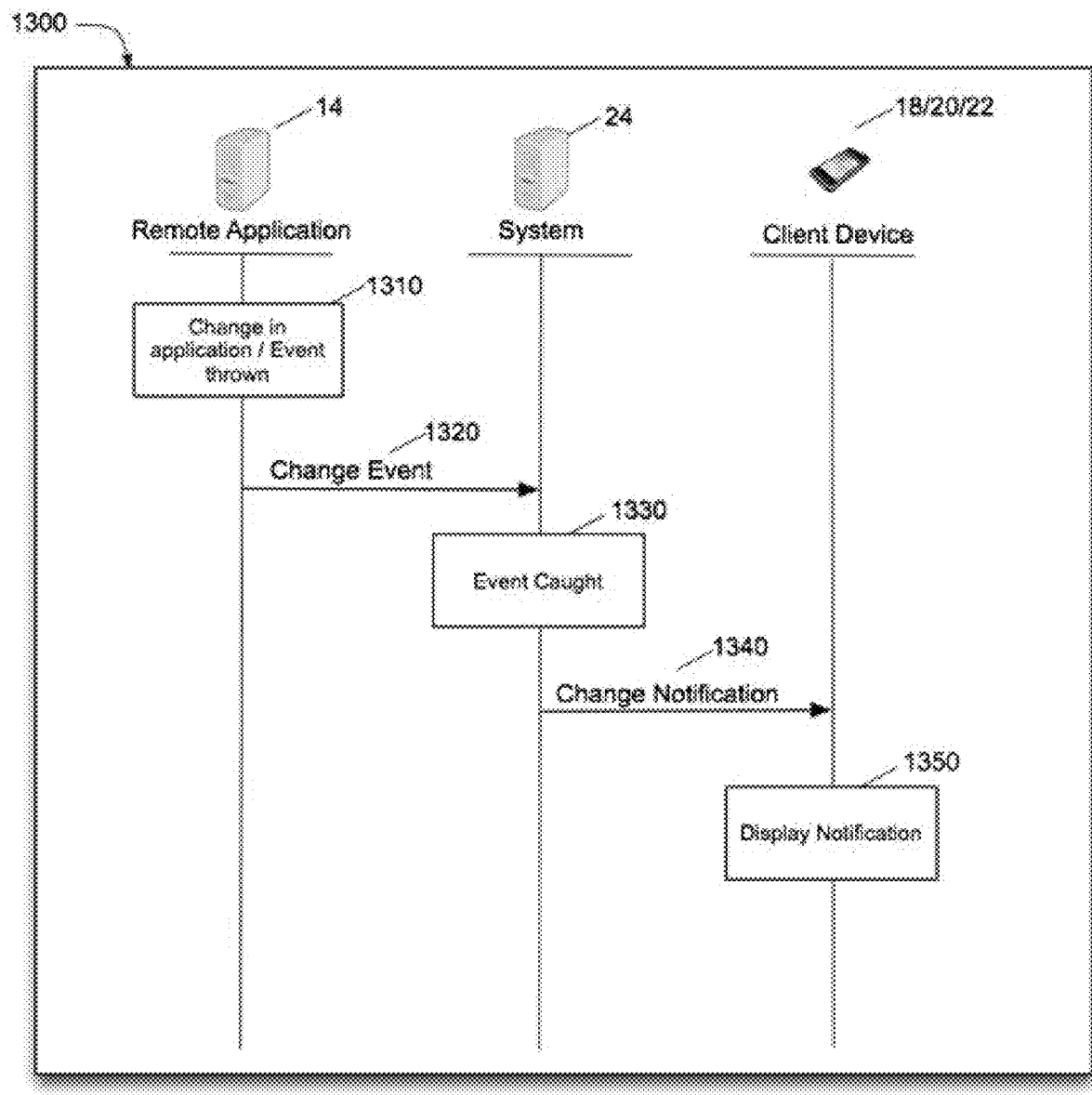
FIG. 4 illustrates an example system communication signaling diagram according to an example embodiment of the present application.

FIG. 4 is a message flow of a dynamic notification. Referring to FIG. 4, a message flow depicting the dynamic notification from an event is caught or intercepted from a remote application 1300. In this scenario, the application resides both in the client computer 18/20/22 and the system server 24. The application executing in the system server 24 registers to be eligible for intercepting or catching the events launched or transmitted from the remote application(s). The event is received and logic to act on the event resides in the system server 24.

The system server 24 registers to receive particular events from remote applications. Event listeners that "listen" for events from remote applications perform this functionality. Particular events that are sent from the remote applications indicate changes made to the internal data in the remote applications made visible through the handling of the transmitted events in the current application. The event may be dispatched in the remote application 1310. This event is broadcast from the remote application, which can be external to the system server 24, or can exist in the system server 24 where both the current application and the remote application exist in the same system server 24. A change event 1320 is dispatched from the remote application 14, sent to the network 16 via the intranet, or the Internet, or some other public or private network. The system server 24, which has previously registered for the event catches the transmitted event and acts accordingly 1330.

The handling of the event occurs in where the functionality executed is based on the received event, including determining the recipients of a notification message that is to be sent. The determination of the respective recipients is detailed below, according to the components of the received event, as well as included data in the change event 1320. Events can be designed to contain specific data including details pertaining to the internal data of the application where the event was generated. Events can be dispatched in an application when a user of the application interacts with a particular component in the application. Calling a "dispatch" operation in an event class, for example, can generate these events. The events dispatched can contain specific information and data that assist the listener(s) in understanding the exact nature of the event.

The system server 24 determines the nature of the "caught" event and processes the logic associated with that particular event, for example, determining the recipient(s) of the change notification message(s) 1340. The change notification message is sent to one or more client device(s) 18/20/22, according to the list of recipient(s) determined in the system server 24. These client device(s) 18/20/22 also contain the current application (or perhaps a version of the current application). The change notification message 1340 is sent through the network 16 where the change notification message 1340 is routed to the client device 18/20/22. Upon receiving a change notification message 1340, the application executing on the client device 18/20/22 displays the notification 1350 along with any details that that were previously received in the change event 1320. The details of the GUI display of the notification are depicted below in FIG. 5.

Figure 5:
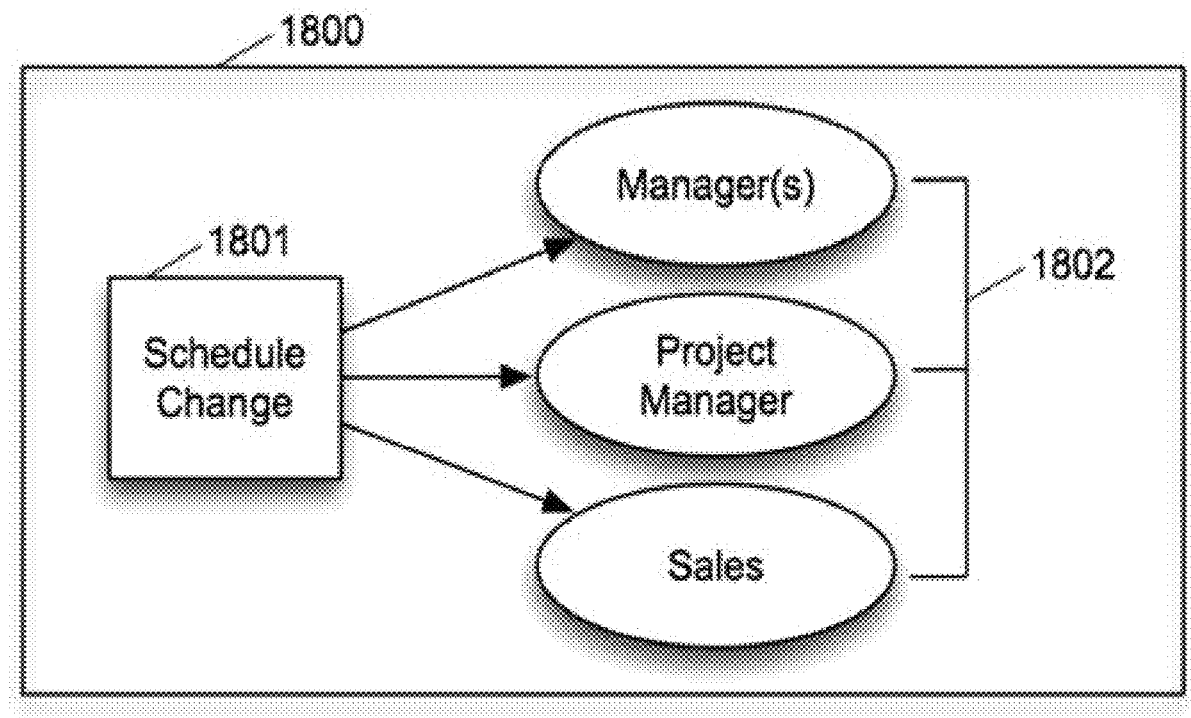
FIG. 5 illustrates an example logic diagram according to example embodiments of the present application.

FIG. 5 illustrates a flowchart of a possible implementation of the dynamic notifications sent when a change to the project schedule is determined. When a change to the project data or preferred project data is determined to be an increase or a decrease in project time 1801, the application automatically sends a notification to the manager(s), the project manager and the sales entities 1802 each of which are predetermined entities to receive such updates. Not all entities who received the initial message or notification will receive updates as some entities may be set to receive the notification but not the updates to the notifications. For example, a hybrid data interface may include a notification and a data feed or source (i.e. project timeline display). Each of five entities including human resources, managers, legal, finance and engineering may receive the initial notification which involved certain project details. However, subsequent updates to the notification and its hybrid display interface may be received by only a select few of those original entities. For example, the update may be based on a timeline to a project change that is audited and intercepted by the monitoring engine of the system server 24. The updates identified may be applied to the timeline data similar to the original data of the hybrid user interface, however, the changes and a subsequent notification update, which are generated after discovering the updated data, may only be forwarded to managers and engineering since their corresponding priority levels may be higher than the other parties of the original notification.

The notification details the alteration of the project change (e.g., delayed roll-out, additional costs needed, hardware delivery delayed, etc.), and includes a window component with the project data feed originally posted. The user has the option to send a further notification to all recipients of the notification to discuss the change further, if deemed necessary or the application will discern the necessary parties to the update and leave the other recipients out of the communication cycle for updates. The application may reside in the client device 18/20/22 or any other device within the architecture including any device containing a processor and memory. Devices may also include wearable devices such as a watch and/or any wearable device.

Figure 6:
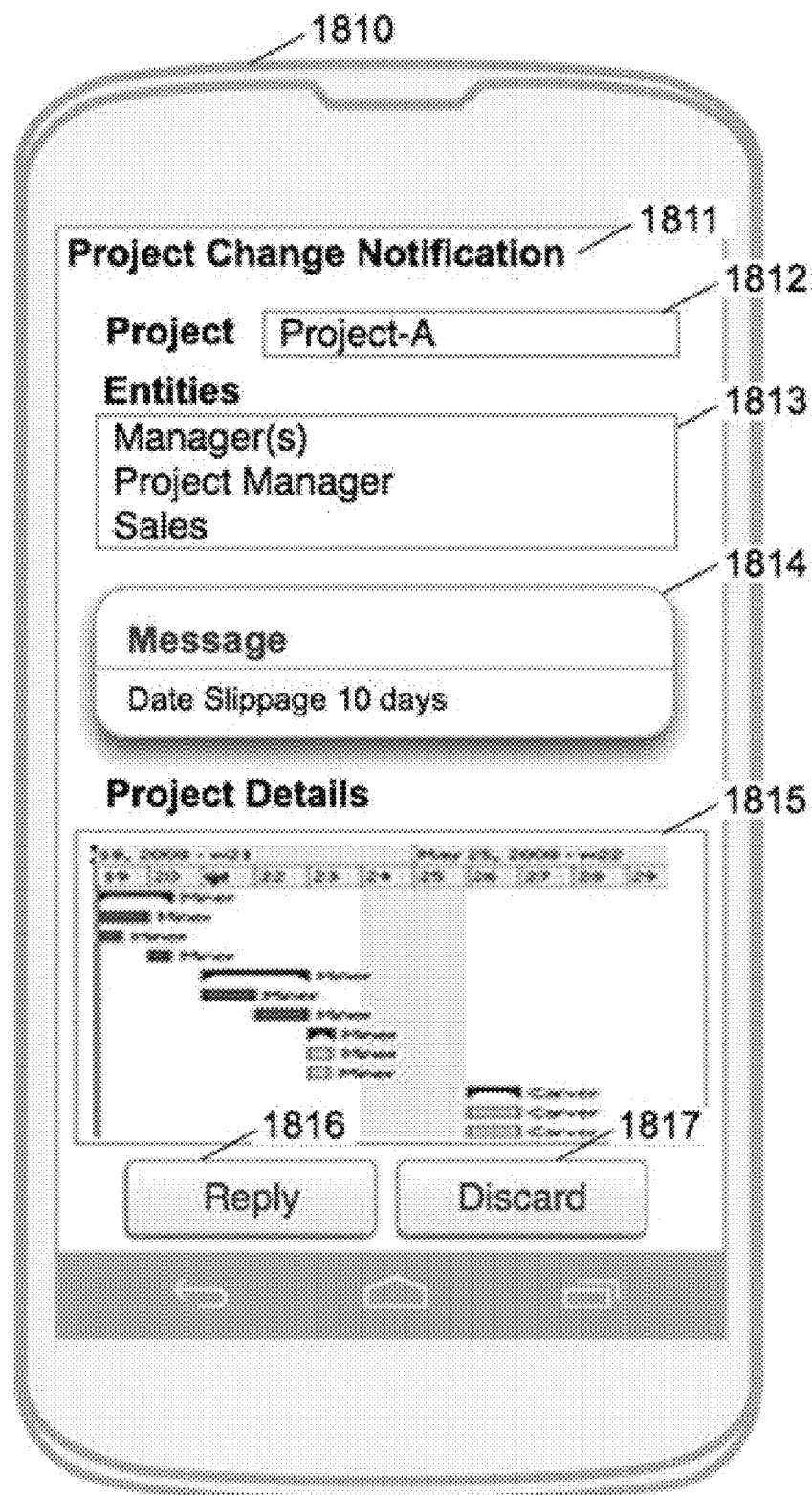
FIG. 6 illustrates an example user interface of a technical assistance application according to an example embodiment of the present application.

FIG. 6 is one implementation of the application where a notification has been dynamically generated and sent notifying entities of a schedule change on a device 1810. The title of the GUI signifies the purpose of the notification 1811. The recipients of the notification are listed 1813. In this scenario, the entities that are receiving the notification are the manager(s) entity, the project manager entity and the sales entity. A message component is included 1814 that displays the change to the project permitting the recipient to understand the reason for the notification. A window component is included 1815 that displays the project data obtained from the API of the project management software. The window component 1815 can be implemented as a scrollable window where the window permits a view of the project management data, which can be scrolled by the viewer. The presentation of project data can display the date change such that the recipient of the notification can determine any impacts of the slippage in a single display.

The user has the option to execute the project management software module by clicking anywhere in the window component 1815. This action halts the current application and brings the external, project management software onto the display of the device. Upon exiting the project management software, the current application is resumed where it was previously halted. This has the effect of permitting the user to interact with other, related applications without the need of manually executing the external product. Finally, there are two components 1816 and 1817. The "Reply" button 1816 sends a message to all recipients listed in the notification 1813. This interaction permits for further communication between all parties involved in making business decisions regarding the project management functionality. The "Discard" button 1817, when pressed, discards the existing notification window and the previous window appears that was present prior to the reception of the current notification. Interactions between the user and the current application may also occur through gestures and/or voice input. These gestures permit interactions with the client device 18/20/22, where the input is non-verbal in nature and the gestures are received through a camera existing on the client device. Other types of gestures are possible through other types of client devices, for example, watches, Internet capable devices or any device connected to the Network 16.

The voice input permits for a user to interact with the application utilizing voice only input. This speech input is converted to text and the text is determined as input for the application. Any device that is coupled to the network 16 could receive this voice input. In addition, the combination of gesture and voice input is also acceptable where the user is able to provide gesture and voice input together where the receiving application takes both input and calculates the multiple sources if input into commands that direct the application.

Figure 7:
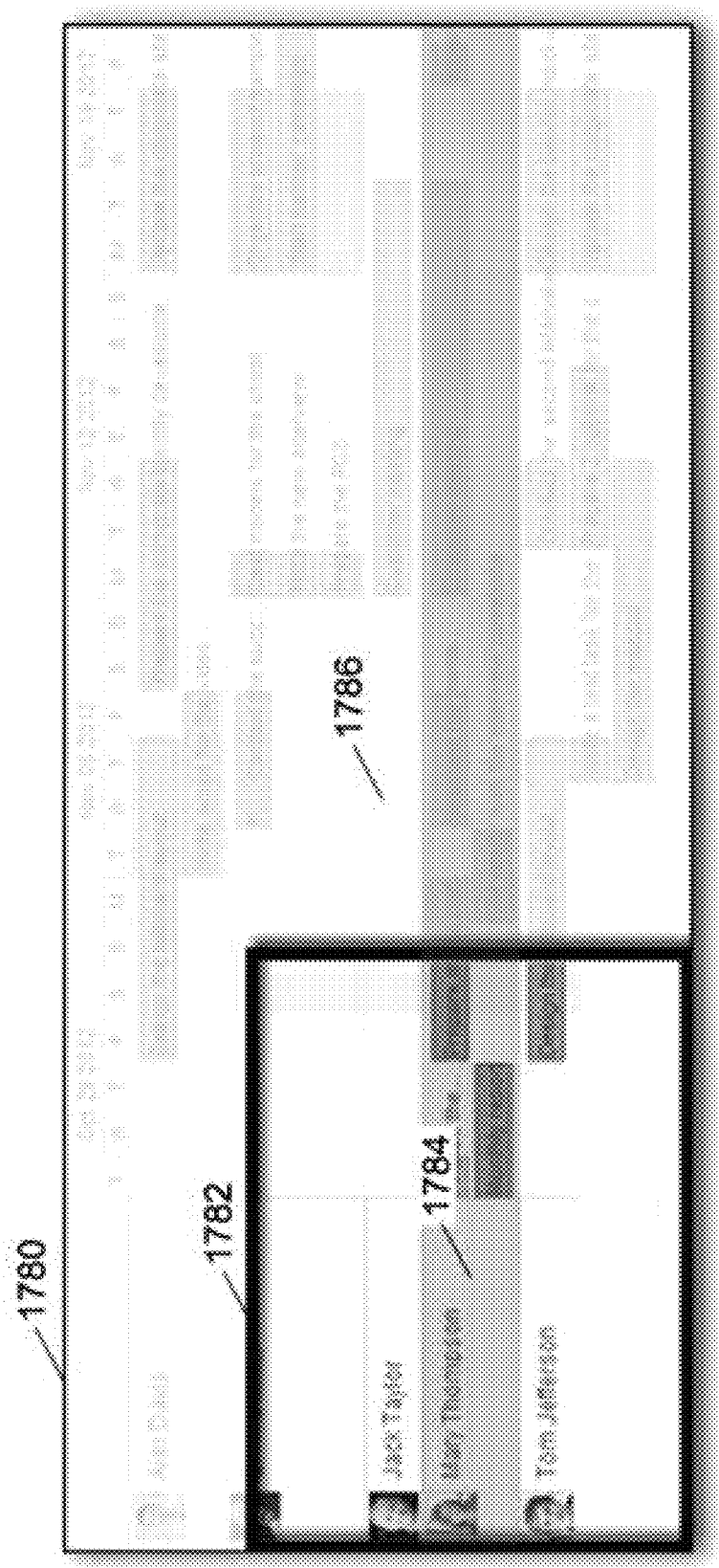
FIG. 7 illustrates another example user interface of a technical assistance application according to an example embodiment of the present application.

FIG. 7 is a snapshot of the project management data of a possible implementation of the application 1780. The data window 1780 is the data that is obtained by accessing the project management API. Furthermore, the data is only a portion of the data that can be obtained. More data is available and the current depiction illustrates only a portion of the obtainable data. The portion that is displayed on the GUI's notification window component is signified by the black box 1782. This is the part of the data that is originally displayed in the notification window. The highlighted area 1784 reflects the developer's assignment in the current project. This is the developer's timeline in the project management data. This area is highlighted showing the viewer of the notification (the project manager in this scenario) the developer that originated the notification. In this example, 'Mary Thompson' originated the notification window. The data outside of the window 1782 is the data that is available to be viewed by the user 1786. The user can utilize the pointing device to move the window 1782 around the data area 1780 to obtain more information with the understanding that only the portion of the data 1780 inside the window 1782 will be displayed at any time. This display of project management data permits the project manager to examine the details of the project focused on the developer that originated the notification. This allows the project manager to ascertain the effect of the delay in the deliverable without having to expressly access the remote project management software and searching for that user.

Figure 8:
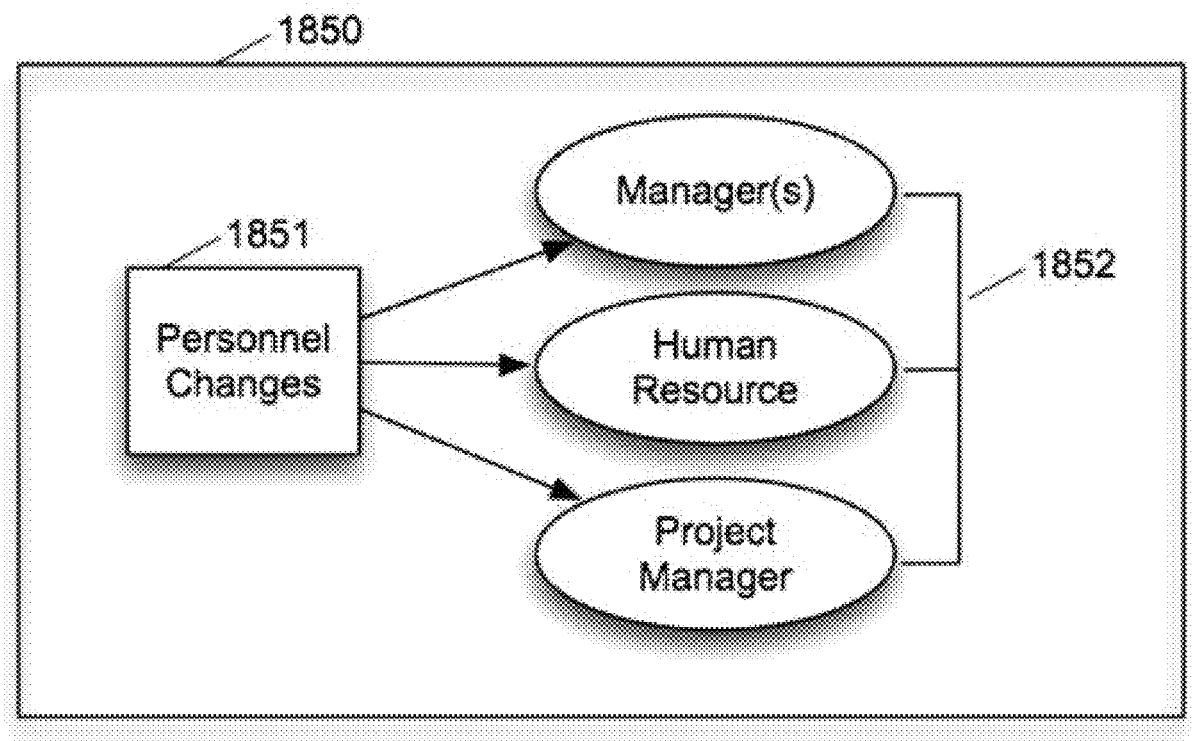
FIG. 8 illustrates another example logic diagram according to example embodiments of the present application.

FIG. 8 is a flowchart of a possible implementation of the dynamic notifications sent when a change to the organization's personnel is determined according to example embodiments. When a change is determined to the personnel either an employee leaving, a new employee joining, any change due to a promotion, etc. 1851, the application automatically sends a notification to the manager(s), the human resource and the project manager entities 1852. The notification details the personnel changes, and may include a window component with the modified organizational chart. The organizational chart can be obtained from access to the remote application's API that includes the current and revised organizational chart of the organization. The user has the option to send a further notification to all recipients of the notification to discuss the change further, if deemed necessary.

Figure 9:
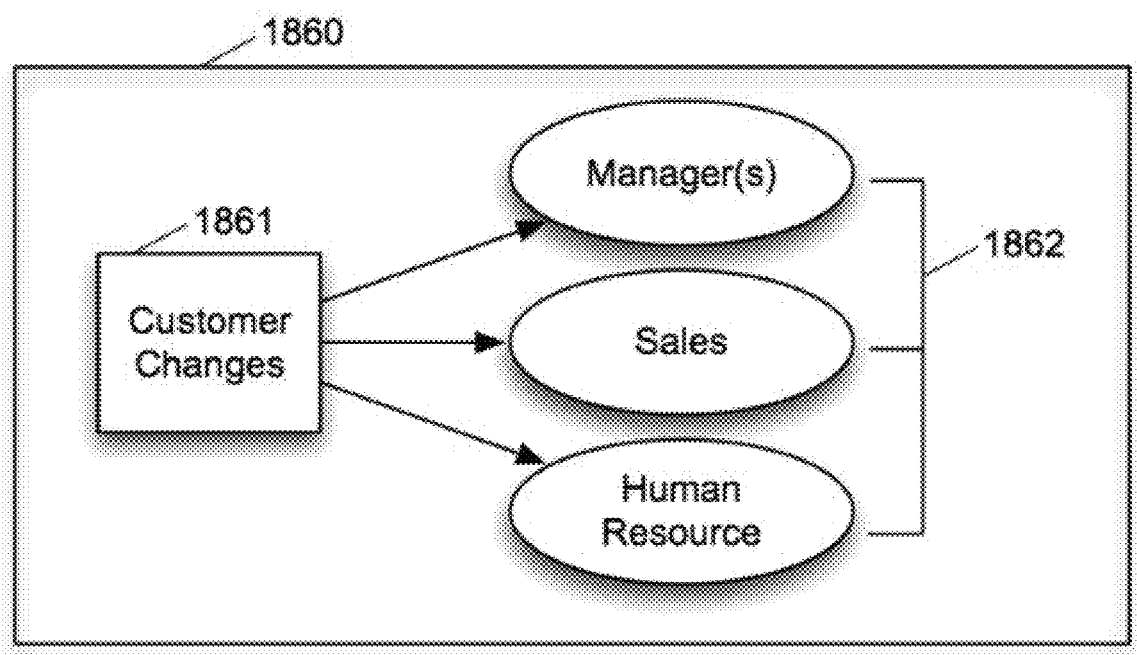
FIG. 9 illustrates yet another example logic diagram according to example embodiments of the present application.

FIG. 9 is a flowchart of a possible implementation of the dynamic notifications sent when a customer change is determined 1861. This can be an addition to a current requirement, a new requirement, a new customer, the removal of a previous customer or any of the many other interactions related to current and future customers of an organization. The application automatically identifies the entities and transmits a notification to the manager(s), the sales and the human resource entities 1862 to notify them of the new customer change. The notification details the customer changes, and may include a window component with sales pipeline data included. The sales pipeline can be obtained from access to the remote application's API that houses the current and revised sales pipeline of the organization. The user has the option to send further notifications to all recipients of the notification to discuss the change further if deemed necessary.

Figure 10:
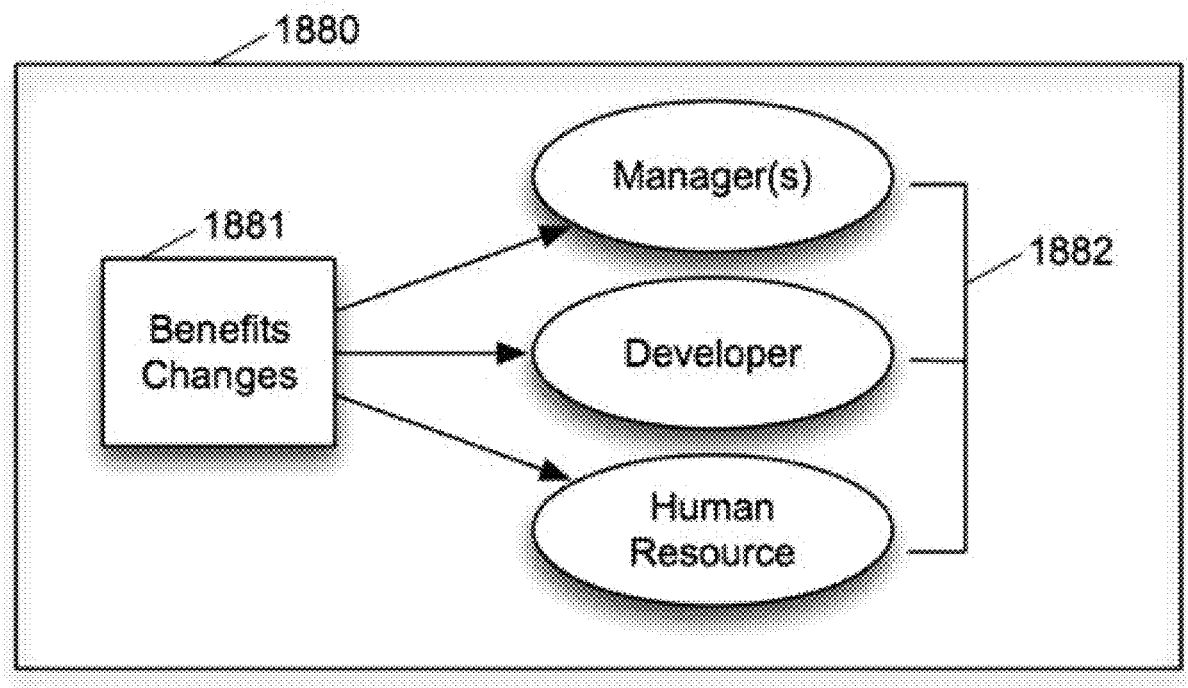
FIG. 10 illustrates still another example logic diagram according to example embodiments of the present application.

FIG. 10 is a flowchart of a possible implementation of the dynamic notifications sent when a benefits change is determined 1881. This can be a modification to benefits (health, dental, 401k, employee matching, etc.). In this case, the application automatically sends a notification to the manager(s), the developers and the human resource entities 1862 to notify them of the new benefits change. The changes in benefits are obtained by access to internal data of the benefits software through published APIs where the $3^{rd}$ party application can obtain access to the data through call operations. Also, events may be intercepted when any alterations to specific internal data transmits an event that is captured and acted upon by the $3^{rd}$ party applications. Having access to the internal data and thrown events permits the current application to send notifications to specific entities within the organization. The notification details the benefits changes, and may include a window component with links to the benefits intranet website data. The user has the option to send further notifications to all recipients of the notification to discuss the change further, if deemed necessary.

The currency of the current locale is used by the application. Currency conversion occurs in the application such that the user views any currency in the application where the currency has automatically been converted prior to being displayed by the application. Published APIs may also exist that permit the conversion of currency for $3^{rd}$ party applications. These APIs offer the current day's exchange rates for all nations of the world. The programmer inputs the current and remote nation and the current exchange rate is returned such that the amount can be displayed in the user's locale. A global locale variable is set in the application specifying the location of all users in the system. This variable is set to the nationality of the current user. Anytime there is a currency amount used in any of the components of the application including such components as the text message component, for example, the application automatically checks the locale variable before displaying the component. If the locale variable is different for the users, for example, the user sending a notification and one or more of the recipients of the notification, the published API is used to convert the currency into a currency in the recipient's nationality. As such, the user receives information in a manner that can be readily understood and acted upon.

According to additional embodiments, many of the applications available to a user perform the same or similar functionality and some are truly unique. Users normally become comfortable with applications used day-to-day without researching if new or otherwise existing applications are available that may offer better options than the applications being used in terms of monetary terms, rating terms, such as comments and/or reviews, functionality terms, compatibility terms, support terms, security terms, etc. The application brings to the user's attention options regarding the applications that the user normally executes on the client device 18/20/22. Embodiments below describe how the application determines alternative applications, how the most optimal quality can be obtained in obtaining new applications, and how the notification is delivered to the user.

The application offers assistance to users by notifying the user(s) of other applications and/or products and reason(s) why the user may be interested in researching other applications and/or products. The notifications may include applications and/or products that the user may not be aware of but which are related to the presently utilized application, applications and/or products that may offer a greater financial value than the currently used application and/or product, applications and/or products that currently have a higher review rating than the current ratings of the currently used application and/or product. Other criteria may include applications and/or products that have obtained a greater number of reviews than the currently used application and/or product, applications and/or products that are compatible with the existing application and/or product, applications and/or products that provide a higher level of security than the existing application and/or product, applications and/or products that provide a higher level of support than existing applications and/or products. The application tracks the applications normally used and analyzes the environment to determine if the user would be interested in alternative applications that perform similar functions but may be a better fit for the user.

Determining alternative applications may include the application building or otherwise obtaining access to a database and/or data store of applications herein referenced as "application data" available to the user of a client device 18/20/22. A data store is a data repository of a set of integrated objects. These objects are modeled using classes defined in database schemas. The data store includes not only data repositories like databases but it is a more general concept that includes also flat files that can store data. The application data is stored local in the client device 18/20/22, in the system server 14/24 that communicates with the client device 18/20/22 through the network 16, the database 12/26 communicably coupled to the system server 14/24, or any element in the system architecture containing a processor and memory. The application data can be obtained through access to an application store published API or built by the application.

If accessed through an API, there exists published APIs utilizing the HTTP Get protocol that returns a list of popular or trending ANDROID applications in a particular category or country. This permits fast retrieval of ANDROID applications that perform well or are gaining popularity in a specific category or country. The search permits the caller to specify parameters that specify parameter name descriptions. For example, for a date range specified, for example, may include a list name, such as 'top apps overall weekly', 'top apps trending daily' and 'top apps local weekly'. A category may include a category of applications, a country may be for the specific country of interest and the language sought may include a price for the given country when returning 'app data'. Those values are the possible parameters for an HTTP query for application data.

The query permits the caller to obtain a real-time list of applications available in an application store. Utilizing this type of query, the current application is able to obtain a current list of all applications that are available for the category of the application currently in use. This list of applications permits the current application to obtain alternative applications that are available to the user which may be better than the currently utilized application. The pricing parameter permits the current application to determine if another application is available at a lower price or possibly free, where the user may be able to switch to the alternative application at a lower cost. In addition, sorting is available on the return dataset. The sort permits for the caller to sort the results according to specific criteria. A 'userRating- Count' sorts the returned dataset according to the current user-rating of the applications returned. This allows the data to return the most popular and/or highest rated applications first.

The returned data can be stored in the database and/or datastore of the current application. Further analysis can be made by the application to determine applications that may be recommended including, price comparisons, application that offer more positive reviews than the application that is currently in use, applications that perform similar functionality or greater functionality than the currently used application, etc.

The user has the ability to provide which aspect of the data is most important. For example, the user can specify that pricing or rating (for example) is the most important aspect of new applications. The configuration section of the current application allows for the user to specify which aspects are most important by choosing elements in a list. In the configuration section of the current application, the possible areas are provided where the user can select which aspects are most important. For example, a list of application attributes is provided to the user in the configuration section where the user is able to select or prioritize the order of importance. This may contain such elements as length on the market (the length of time the application has been available), pricing of the application, comments (i.e., the number of comments regarding the application), rating (i.e., the number of reviews and/or stars an application has received), compatibility, support, security, etc.

Using the data obtained from alternative applications available, the current application makes suggestions to the user in the form of notifications presented to the user's client device 18/20/22. These notifications present alternative applications that may be of interest to the user.

Figure 11:
FIG. 11 illustrates another example user interface of a technical assistance application according to an example embodiment of the present application.

FIG. 11 is one implementation of the application interface where a notification has been dynamically generated and sent notifying of alternative applications that may be of interest to the user 1900, according to example embodiments. The notification window 1901 can be implemented as a popup window component that is overlaid over the existing components on the display of the client device 18/20/22. An "X" button 1902 permits the user to dismiss the popup window component 1901 with one interaction. The title "Application Notification" signifies to the user the context of the window. The message of the notification 1903 signifies the correspondence that the application is relaying. In this example, the notification first identifies the existing application pertaining to the message: "EmpBenefits", which is the name of the application that the user utilizes. Then, the application identifies that there are other applications that may be of interest and specifies the reasons for the recommendation. In this example, there are two reasons which the alternative application may be mentioned, the first is the user comments appear to be better than the ratings of the present application and the second is the price is lower than the present application. This information can be determined by the data pulled from the HTTP Get API query that queries all applications available on the client device 18/20/22. The comments pertain to the star ratings from other users and are returned in the HTTP Get API query. The ratings returned are compared with the rating of the currently utilized application. The prices of the applications are also returned in the HTTP Get API query and are compared with the price of the currently utilized application. Other factors such as integration with existing applications and systems, support, security, etc., can also be considered.

There are two buttons 1904/1905 on the bottom of the notification which permit the user to interact with the window. The first button "View" 1904 permits the user to view the other recommended applications in another window. This can be implemented as another notification, or the application can navigate the user to the application store of the client device 18/20/22 with the recommended applications. The user has the ability to download those applications in that window. The second button "Discard" 1905 permits the window to be removed without any further interaction. In another example, applications among a single company are monitored such that when a new product is released or updated, the current application notifies the user-base as to the change and permits them to easily access the new or updated product.

Promotional and discount codes are common in today's market. These codes permit users to receive a discount on a product. Current APIs published permit for the retrieval of promotional and discount codes and interworking with these APIs allows for $3^{rd}$ party applications to retrieve current discounts to particular products. Discount codes are created for products through POST requests. The following part of an Object structure accept POST requests which allow developers to create new discount codes or update existing codes:

discount_id=The discount ID;
code=The discount code;
amount_off=The fixed amount off the ticket price;
percent_off=The percentage off the ticket price;
tickets=Comma-separated list of ticket IDs for which the discount applies;
start_date=The discount start date and time, in ISO 8601 format (e.g., "2007-12-31 23:59:59");
end_date=The discount end date and time, in ISO 8601 format (e.g., "2007-12-31 23:59:59");
quantity_available=Maximum number of times this discount can be used;
quantity_sold=Number of times this discount has been used.

The examples above illustrate the possible parameters for an HTTP POST for creating discount codes. This similar data can be used for HTTP GET queries in obtaining current discount codes for products. By monitoring these promotion and discount codes, the application can notify the user in one or more of the following conditions: an application that is similar to an application that the user currently regularly uses offers a new discount code that may be of interest to the user. An application that the user currently utilizes offers a promotion and the user may be interested in obtaining this discount by contacting the application developer. In another example, through the use of the published APIs, the application monitors both the applications that the user normally utilizes and applications in the same or similar category of applications that the user normally utilizes. Notifications are presented to the user where interest may be found in applications that have an increase in the ranking status as signified by the number of stars provided by the users of the application. Due to the increase in the ranking of the application(s), the user may become more interested in that application. This process continues as the application continuously obtains current data pertaining to the cost and the ranking of the applications that are in the same or similar category of application that the user normally utilizes. These notifications permit a real-time notification such that the user is made aware of the application environment and is kept abreast as the evolution of the applications' status becomes more favorable. Comparisons are also presented to the user that permit for educated decisions on whether another application may be of interest to the user. For example, one application currently being utilized cost $35 and has an average ranking of 3.5 stars. Another application that is in the same or a similar category cost $99 and has an average ranking of 4.5 stars, and thus may be of interest to the user. This information is obtained from published APIs where the current pricing and/or user-ranking is obtained from applications in the same or similar category the application that is in use by the user. These notifications can be periodic and used to inform the user to make informed decisions, or permit the user to investigate other applications that may be more advantageous for the user.

Within organizations, up to 80% of people with more than 1000 employees bypass the IT department and use or even buy software that lives primarily within the cloud, according to a recent market-research firm. These applications may be as simple as cloud services offered by large companies that permit easy access to online (or cloud) storage by multiple devices, or more specific (data per application) data storage. As the trend continues, it becomes necessary to inform the proper departments or personnel permitting them to become aware of the use of the unauthorized software utilized within the organization.

In another embodiment of the current application, the application monitors the applications that are normally utilized by users within an organization to determine the normally utilized applications within the community. Notifications are provided to the department (normally the IT department) or individual(s) responsible for making decisions involving software within the organization. The notifications may provide the recipients with insight of unauthorized software the users within the organization are normally utilizing. As employees within the organization use the unauthorized applications, the IT department and/or responsible personnel can research these applications to determine their security policies and provide guidelines to retain the security necessary for the organization. Alternatively, the applications that are deemed secure may be published as acceptable by the organization assuming that the guidelines are followed. The applications are monitored through the interaction with published APIs on the client devices 18/20/22. These devices are normally within the organization and if they are personal devices of the employees within the organization then authorization will be provided to the organization for use in the normal business activities of the organization. Having obtained access to the client devices 18/20/22, the applications that are executed on the device(s) are monitored by the organization through the current application. The application builds a database of applications that are being utilized in the employees' client device 18/20/22. The application data is stored local in the client device 18/20/22, in the system servers 14/24 that communicate with the client device 18/20/22 through the network 16, the database 12/26 communicably coupled to the system 14/24, or any element in the system architecture containing a processor and memory. The list of verified applications are also provided to the application and stored in the same or similar database containing applications that are acceptable for use by employees within the organization. Comparisons are made between the applications being utilized and those that are verified and queries upon the database permit for the user to ascertain which (if any) applications are being utilized that fall outside of the accepted and verified applications. Notifications (as depicted above) are sent by the application of the current application detailing what applications are being utilized that are considered unverified. At that point, the proper personnel within the organization regarding how to approach the issue may make decisions.

Figure 12:
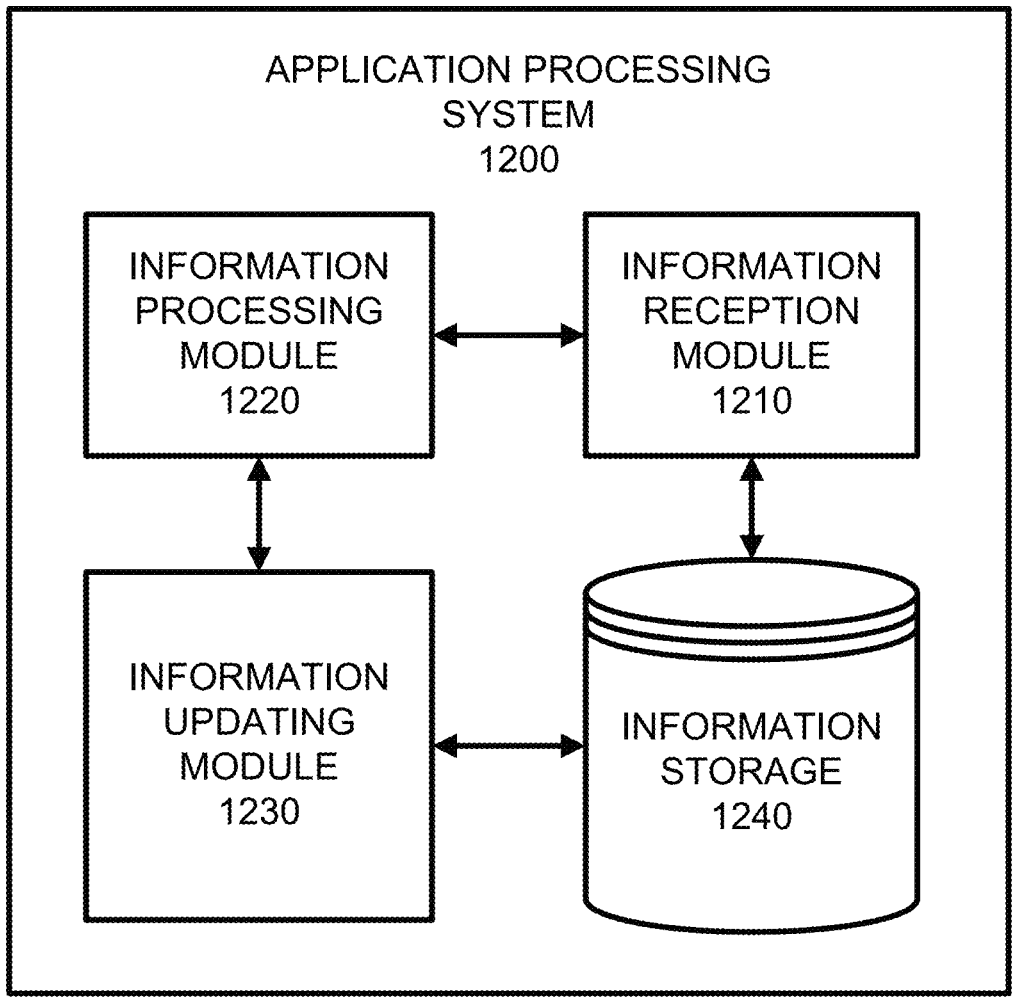
FIG. 12 illustrates a system configuration configured to perform one or more of the example embodiments of the present application.

FIG. 12 illustrates a notification system configuration configured to perform one or more of the example embodiments of the present application. Referring to FIG. 12, the user information management system 1200 may be a module or device(s) that is configured to perform any of the above-noted operations. For instance, the system 1200 may include an information reception module 1210 that receives information as user data is accumulated based on identified queries, interests or other actions that cause information to be received and logged in accordance with a user account. The information processing module 1220 is responsible for retrieving the user information stored in memory 1240 and attempting to create user suggestions, notifications and perform subsequent processing operations based on the known user initiated operations. The information update module 1230 is responsible for storing in memory the user actions and changes to user information that may occur from known user actions, preferences and current interests.

The system configuration 1200 of FIG. 12 is configured to perform various different methods of operation in accordance with example embodiments of the present application. One example method of operation may include parsing notification message content of a notification message, linking a data source to the notification message content to create a hybrid user interface data feed, transmitting the initial hybrid user interface data feed to the plurality of message recipients, monitoring at least one of the plurality of data sources to identify a change to data content of the initial hybrid user interface data feed, intercepting a change parameter during the monitoring of the at least one of the plurality of data sources; and updating the hybrid user interface data feed based on the intercepted change parameter.

The various message recipients may be assigned to one or more business entities of an organizational structure stored in memory. Updating the hybrid user interface data feed further includes transmitting the updated hybrid user interface data feed to a portion of the plurality of recipients. Identifying a primary job function of each of the recipients may include identifying a priority level associated with the primary job function of each of the recipients, and transmitting the updated hybrid user interface data feed to the portion of the recipients having a minimum threshold priority level.

The parsing of the notification message content may include extracting words from the notification message, comparing and matching the extracted words to a word associated with the primary job function, and comparing and matching the extracted words to a word associated with the data source. The data source may be any of a chart, a graph, a hyperlink, a data file, a timeline, an image, a video, and an enterprise application module. The change parameter may include any of a timeline change, a monetary change, a staff number changer and project related change. Other operational functions include identifying a present application being utilized on a computing device and identifying an attribute of the present application, and comparing the attribute of the present application to attributes of other applications not currently being utilized by the computing device, matching the attribute of the present application to an attribute of a comparable application responsive to the comparing of the attribute to attributes of other applications, and generating a notification in a user interface of the present application to identify the comparable application.

Other operations include identifying an attribute of the present application by parsing content input to the present application and determining at least one primary function of the present application. Parsing the content input to the present application further includes extracting words from the content input to the present application, and comparing and matching the extracted words a word associated with the other applications. The notification being generated in the user interface of the present application to identify the comparable application includes providing an incentive associated with the comparable application. The incentive may include at least one of a time saving incentive, a monetary saving incentive and a user rating incentive. Other operations may provide identifying other applications associated with the computing device, and storing application metrics associated the other applications. The method may also perform comparing the application metrics to comparable applications and identifying an application with a higher rating than the other of the various applications associated with the computing device.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 13 illustrates an example network element 1300, which may represent any of the above-described network components, etc.

Figure 13:
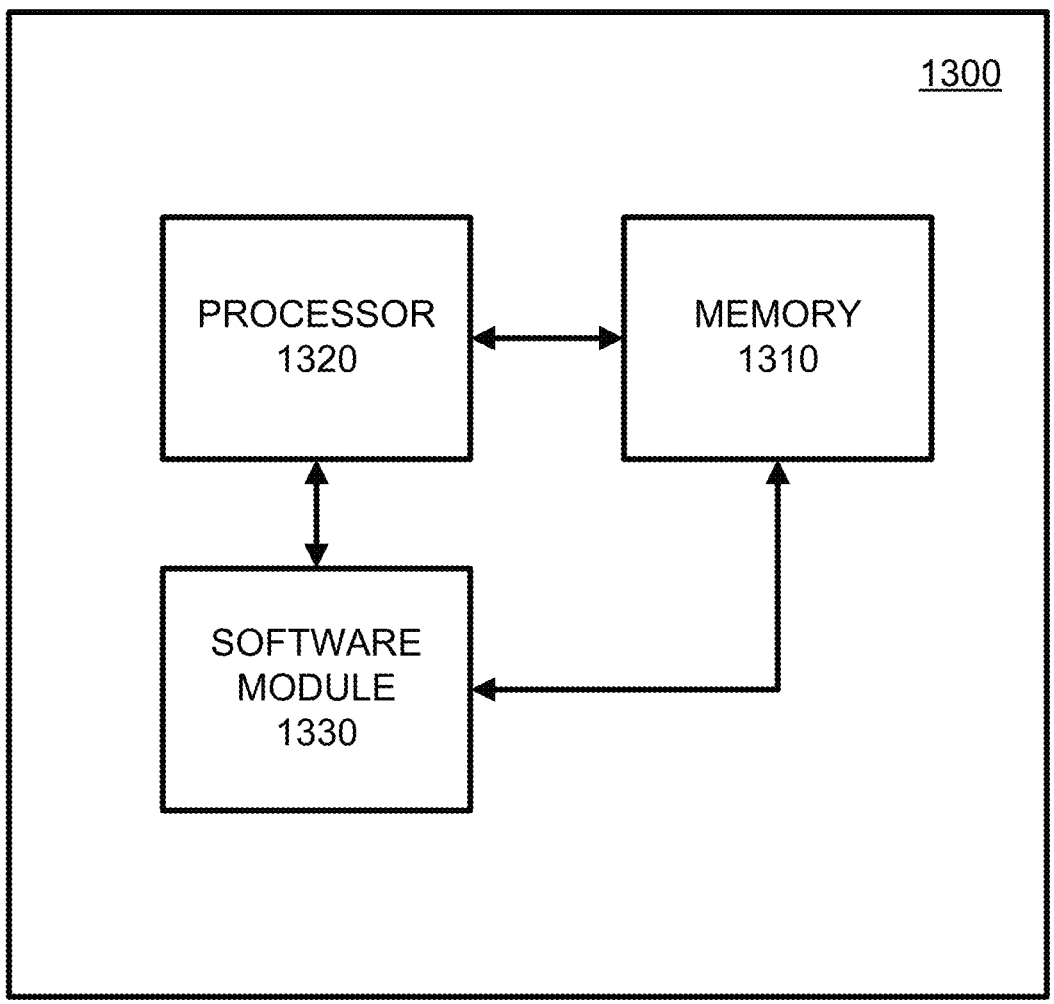
FIG. 13 illustrates an example network entity device configured to store instructions, software, and corresponding hardware for executing the same, according to example embodiments of the present application.

As illustrated in FIG. 13, a memory 1310 and a processor 1320 may be discrete components of the network entity 1300 that are used to execute an application or set of operations. The application may be coded in software in a computer language understood by the processor 1320, and stored in a computer readable medium, such as, the memory 1310. The computer readable medium may be a non-transitory computer readable medium that includes tangible hardware components in addition to software stored in memory. Furthermore, a software module 1330 may be another discrete entity that is part of the network entity 1300, and which contains software instructions that may be executed by the processor 1320. In addition to the above noted components of the network entity 1300, the network entity 1300 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 8 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   registering, by a server application, for a specific event indicating a project schedule change in a remote application through a published API offered by the remote application, the project schedule change denoting an increase or a decrease in project time;
   parsing notification message content of a notification message from the remote application corresponding to the specific event;
   determining the notification message content comprises a same word associated with another application different from the remote application;
   providing a notification that identifies the other application, the notification comprising one or more of a time saving incentive, a monetary saving incentive, and a user rating incentive;
   determining a plurality of message recipients, by the server application, from the notification message content;
   linking a data source to the notification message content to create an initial hybrid user interface data feed;
   transmitting the initial hybrid user interface data feed to the plurality of message recipients;
   monitoring at least one of a plurality of data sources to identify a change to data content of the initial hybrid user interface data feed;
   intercepting a change parameter from the remote application during the monitoring of the at least one of the plurality of data sources;
   updating the hybrid user interface data feed based on the intercepted change parameter; and
   transmitting the updated hybrid user interface data feed to a subset of the plurality of message recipients, the hybrid user interface data comprising a window component presenting a graphical view of project data, the subset of the plurality of message recipients having a higher priority than other message recipients not in the subset of the plurality of message recipients;
   wherein the plurality of message recipients are each assigned to at least one business entity of an organizational structure stored in memory;
   wherein the updated hybrid user interface data feed is transmitted to the subset of the plurality of message recipients.

2. The method of claim 1, further comprising:
   identifying a primary job function of each of the plurality of recipients;
   identifying a priority level associated with the primary job function of each of the plurality of recipients; and
   transmitting the updated hybrid user interface data feed to the subset of the plurality of message recipients having a minimum threshold priority level.

3. The method of claim 2, wherein parsing the notification message content further comprises:
   extracting words from the notification message;
   comparing and matching the extracted words to at least one word associated with the primary job function; and
   comparing and matching the extracted words to at least one word associated with at least one data source of the plurality of data sources.

4. The method of claim 2, wherein the at least one data source comprises at least one of a chart, a graph, a hyperlink, a data file, a timeline, an image, a video, and an enterprise application module.

5. The method of claim 1, wherein the change parameter comprises at least one of a timeline change, a monetary change, a staff number change, and a project related change.

6. An apparatus comprising:
   a memory;
   a processor configured to:
      register, by a server application, for a specific event that indicates a project schedule change in a remote application through a published API offered by the remote application, the project schedule change denotes an increase or a decrease in project time;
      parse notification message content of a notification message from the remote application corresponding to the specific event;
      determine the notification message content comprises a same word associated with another application different from the remote application;
      provide a notification that identifies the other application, the notification comprising one or more of a time saving incentive, a monetary saving incentive, and a user rating incentive;
      determine a plurality of message recipients, by the server application, from the notification message content; and
      link a data source to the notification message content to create an initial hybrid user interface data feed; and
   a transmitter configured to:
      transmit the initial hybrid user interface data feed to the plurality of message recipients,
   wherein the processor is further configured to:
      monitor at least one of a plurality of data sources to identify a change to data content of the initial hybrid user interface data feed,
      intercept a change parameter from the remote application during the monitoring of the at least one of the plurality of data sources,
      update the hybrid user interface data feed based on the intercepted change parameter; and
      transmit the updated hybrid user interface data feed to a subset of the plurality of message recipients, the hybrid user interface data comprising a window component presenting a graphical view of project data, the subset of the plurality of message recipients having a higher priority than other message recipients not in the subset of the plurality of message recipients;
wherein the plurality of message recipients are each assigned to at least one business entity of an organizational structure stored in memory;
wherein the updated hybrid user interface data feed is transmitted to the subset of the plurality of message recipients.

7. The apparatus of claim 6, wherein the processor is further configured to:
identify a primary job function of each of the plurality of recipients, and
identify a priority level associated with the primary job function of each of the plurality of recipients, and
the transmitter is further configured to:
transmit the updated hybrid user interface data feed to the subset of the plurality of message recipients having a minimum threshold priority level.

8. The apparatus of claim 7, wherein the processor parses the notification message content by being further configured to:
extract words from the notification message,
compare and match the extracted words to at least one word associated with the primary job function, and
compare and match the extracted words to at least one word associated with at least one data source of the plurality of data sources.

9. The apparatus of claim 7, wherein the at least one data source comprises at least one of a chart, a graph, a hyperlink, a data file, a timeline, an image, a video, and an enterprise application module.

10. The apparatus of claim 6, wherein the change parameter comprises at least one of a timeline change, a monetary change, a staff number change, and a project related change.

11. A non-transitory computer readable storage medium configured to store instructions that when executed cause a processor to perform:
registering, by a server application, for a specific event indicating a project schedule change in a remote application through a published API for a specific event from a remote application through a published API offered by the remote application, the project schedule change denoting an increase or a decrease in project time;
parsing notification message content of a notification message from the remote application corresponding to the specific event;
determining the notification message content comprises a same word associated with another application different from the remote application;
providing a notification that identifies the other application, the notification comprising one or more of a time saving incentive, a monetary saving incentive, and a user rating incentive;
determining a plurality of message recipients, by the server application, from the notification message content;
linking a data source to the notification message content to create an initial hybrid user interface data feed;
transmitting the initial hybrid user interface data feed to the plurality of message recipients;
monitoring at least one of a plurality of data sources to identify a change to data content of the initial hybrid user interface data feed;
intercepting a change parameter from the remote application during the monitoring of the at least one of the plurality of data sources;
updating the hybrid user interface data feed based on the intercepted change parameter; and
transmitting the updated hybrid user interface data feed to a subset of the plurality of message recipients, the hybrid user interface data comprising a window component presenting a graphical view of project data, the subset of the plurality of message recipients having a higher priority than other message recipients not in the subset of the plurality of message recipients;
wherein the plurality of message recipients are each assigned to at least one business entity of an organizational structure stored in memory;
wherein the updated hybrid user interface data feed is transmitted to the subset of the plurality of message recipients.

12. The non-transitory computer readable storage medium of claim 11, wherein the processor is further configured to perform:
identifying a primary job function of each of the plurality of recipients, and
identifying a priority level associated with the primary job function of each of the plurality of recipients, and
transmitting the updated hybrid user interface data feed to the subset of the plurality of message recipients having a minimum threshold priority level.

13. The non-transitory computer readable storage medium of claim 12, wherein parsing the notification message content further comprises:
extracting words from the notification message;
comparing and matching the extracted words to at least one word associated with the primary job function; and
comparing and matching the extracted words to at least one word associated with at least one data source of the plurality of data sources.

14. The non-transitory computer readable storage medium of claim 12, wherein the at least one data source comprises at least one of a chart, a graph, a hyperlink, a data file, a timeline, an image, a video, and an enterprise application module.

* * * * *